US011807051B1

(12) United States Patent
Gesto

(10) Patent No.: US 11,807,051 B1
(45) Date of Patent: Nov. 7, 2023

(54) TIRE BEAD SEATING DEVICE

(71) Applicant: Pro-Tote Systems, Inc., South Bend, IN (US)

(72) Inventor: James Gesto, South Bend, IN (US)

(73) Assignee: Pro-Tote Systems, Inc., South Bend, IN (US)

( * ) Notice: Subject to any disclaimer, the term of this patent is extended or adjusted under 35 U.S.C. 154(b) by 0 days.

(21) Appl. No.: 18/191,610

(22) Filed: Mar. 28, 2023

Related U.S. Application Data

(63) Continuation-in-part of application No. 18/191,554, filed on Mar. 28, 2023.

(51) Int. Cl.
*B60C 25/12* (2006.01)

(52) U.S. Cl.
CPC .................................. *B60C 25/12* (2013.01)

(58) Field of Classification Search
CPC ........ B60C 25/12; B60C 25/145; B60S 5/043
See application file for complete search history.

(56) References Cited

U.S. PATENT DOCUMENTS

| | | | | |
|---|---|---|---|---|
| 3,552,469 A * | 1/1971 | Corless | ................. | B60C 25/145 157/1.1 |
| 3,675,705 A * | 7/1972 | Corless | ................. | B60C 25/145 157/1.1 |
| 3,677,320 A * | 7/1972 | Corless | ................. | B60C 25/145 157/1.1 |
| 3,683,991 A * | 8/1972 | Ruhland | ............... | B60C 25/145 157/1.1 |
| 3,814,163 A * | 6/1974 | Charles | ................. | B60C 25/145 157/1.1 |
| 3,866,654 A * | 2/1975 | Duquesne | ............. | B60C 25/145 157/1.1 |
| 4,263,958 A * | 4/1981 | Corless | ................. | B60C 25/145 157/1.1 |

(Continued)

FOREIGN PATENT DOCUMENTS

| CN | 207089347 U | 3/2018 |
|---|---|---|
| CN | 210882056 U | 6/2020 |

(Continued)

OTHER PUBLICATIONS

"Safety inflation cage IC Box", M&B Engineering SRL, 2 pages, <https://www.mbengineering.info/en/safety-cage/safety-inflation-cage ic-box/>, last visited Mar. 28, 2023.

(Continued)

*Primary Examiner* — David B. Thomas
(74) *Attorney, Agent, or Firm* — Lathrop GPM LLP; Alex Shtraym; Richard Beem

(57) ABSTRACT

The present invention relates generally to tire servicing operations and, more specifically, to an improved tire bead seating device. The bead seating device may include an inlet configured to receive pressurized air. The inlet may couple to two or more outlets extending outwardly from a shell of the device. Further, a leg may extend downwardly from each outlet and include a nozzle for directing a pressurized gas into a cavity of a tire. In particular, pressurized air may be delivered via the nozzles to force the tire bead onto the rim flange. Advantageously, the bead seating device may emit a high volume of air through each nozzle to accommodate for wheel assemblies of different diameters.

20 Claims, 3 Drawing Sheets

(56) References Cited

U.S. PATENT DOCUMENTS

| | | | | |
|---|---|---|---|---|
| 5,042,547 | A * | 8/1991 | Van De Sype | B60C 25/145 157/1.1 |
| 5,247,982 | A * | 9/1993 | Miller | B60C 25/145 157/1.1 |
| 5,509,456 | A * | 4/1996 | Bonko | B60C 25/145 157/1.1 |
| 5,570,733 | A * | 11/1996 | Desparois | B60C 25/145 157/1.1 |
| 5,857,481 | A * | 1/1999 | Zimmerman | B60S 5/043 137/227 |
| 5,878,801 | A * | 3/1999 | Ellis | B60C 25/145 157/1.1 |
| 5,884,659 | A * | 3/1999 | Prosser | B60S 5/04 157/1.1 |
| 7,000,667 | B2 * | 2/2006 | Brahler, II | B60C 25/145 157/1.17 |
| 7,188,518 | B2 * | 3/2007 | Gonzaga | B60C 25/145 73/146 |
| 7,311,129 | B1 * | 12/2007 | White | B60C 25/145 73/146 |
| 8,757,236 | B2 * | 6/2014 | White | B60C 25/145 157/1.21 |
| 9,346,331 | B2 * | 5/2016 | Lundberg | F16L 25/00 |
| 9,475,352 | B2 * | 10/2016 | Barrios | F16K 1/34 |
| 9,630,595 | B1 * | 4/2017 | Ochoa | B60C 25/145 |
| 9,914,437 | B2 * | 3/2018 | Ochoa | B60C 25/145 |
| 10,065,463 | B2 * | 9/2018 | Lawson | B60C 25/145 |
| 2005/0082013 | A1 | 4/2005 | White | |
| 2014/0216600 | A1 * | 8/2014 | Lawson | B60C 25/145 141/38 |

FOREIGN PATENT DOCUMENTS

| | | |
|---|---|---|
| CN | 211196157 U | 8/2020 |
| WO | 00/68030 A1 | 11/2000 |

OTHER PUBLICATIONS

"TBR 1200 Safety Inflation Cage", Ahcon DK, 3 pages, <https://ahcon.dk/en/products/wheel-service-equipment/safety-inflation-cages/tbr-1200-safety-inflation-cage>, last visited Mar. 28, 2023.

"Automatic Safety Inflation Cage: Model WS-35026", Ari-Hetra, 1 page, <www.ari-hetra.com>, last visited Mar. 28, 2023.

* cited by examiner

TIRE BEAD SEATING DEVICE

CROSS-REFERENCE TO RELATED APPLICATIONS

This application claims benefit of U.S. application Ser. No. 18/191,554 filed on Mar. 28, 2023, which is incorporated by reference in its entirety.

FIELD OF INVENTION

The present invention relates generally to tire servicing operations and, more specifically, to an improved tire bead seating device.

BACKGROUND OF THE INVENTION

Large vehicles such as trucks, tractors, trailers, buses and off-road machines often require servicing after prolonged periods of use, damage or for various other reasons. Servicing of such vehicles often includes the replacement and/or inflation of wheel assemblies, which may include a tire mounted on a rim.

The replacement of a tire often requires mounting a tire on a rim. In particular, a seal must be formed between the rim and tire. Typically, a bead seater is used to deliver a large volume of highly pressured air into the cavity of a tire to force the tire beads into the rim flange.

Conventional bead seaters or blasters typically include a pressurized air tank with a valve leading to a single discharge barrel. The tank and discharge barrel may be positioned to blow a high volume of air from the pressurized air tank into the tire. Conventional blasters, however, are often not configured to deflect pressurized air and nearby debris. Also, traditional blasters may not accommodate wheel assemblies of different shapes and sizes. Moreover, if tires have been stacked on top of each other, the opening between sidewalls of a tire may be compressed or narrowed, such that it may be difficult to aim a blast of air into such opening.

Accordingly, there is a need for an improved bead seating device that is configured to create an airtight seal between the bead of a tire and a rim effectively and efficiently. The present invention satisfies this need.

SUMMARY OF THE INVENTION

The present invention relates generally to tire servicing operations and, more specifically, to a bead seating device configured to direct pressurized gas into an interior cavity of tire for creating create an airtight seal between the bead of the tire and a rim.

In one aspect, the bead seating device may include an inlet and two or more outlets. The inlet may include an intake end configured to receive pressurized gas, such as from an air source. Further, the inlet may include a valve configured to control a flow of the pressurized gas. A supply end of the inlet may be coupled with a splitter.

Outlets may couple with the splitter and extend radially. Further, each outlet may include a leg and a nozzle. Legs may extend downwardly from corresponding outlets. Also, nozzles may be rotatably coupled to each leg and configured to direct pressurized gas for seating the tire bead. It is contemplated that each leg may be extendable relative to each corresponding outlet. Moreover, each nozzle may be angled to direct pressurized gas for seating the tire bead.

Additional components of the bead seating device may include a shell, handgrip, and screens. The shell may be semicircular in shape and configured to be removably coupled to a tire servicing cage. Further, the shell may encompass the splitter and portions of the inlet and outlets. In particular, the inlet may extend upwardly from a top of the shell. Outlets may extend outwardly from the shell.

The handgrip may be secured to at least two outlets. An operator may hold the bead seating device via the handgrip to position the nozzles with minimum effort into a cavity of a tire. Further, the device may include one or more screens. Screens may be arranged between the outlets and secured to one another via straps. It is contemplated that screens may be made of a clear material, such as acrylic to allow for visibility. Further, screens may be configured to deflect pressurized air and debris during operation of the device.

The present invention and its attributes and advantages will be further understood and appreciated with reference to the detailed description below of presently contemplated embodiments, taken in conjunction with the accompanying drawings.

BRIEF DESCRIPTION OF THE DRAWINGS

The preferred embodiments of the invention will be described in conjunction with the appended drawings provided to illustrate and not to limit the present invention, where like designations denote like elements, and in which.

DETAILED DESCRIPTION OF THE INVENTION

Figure 1:
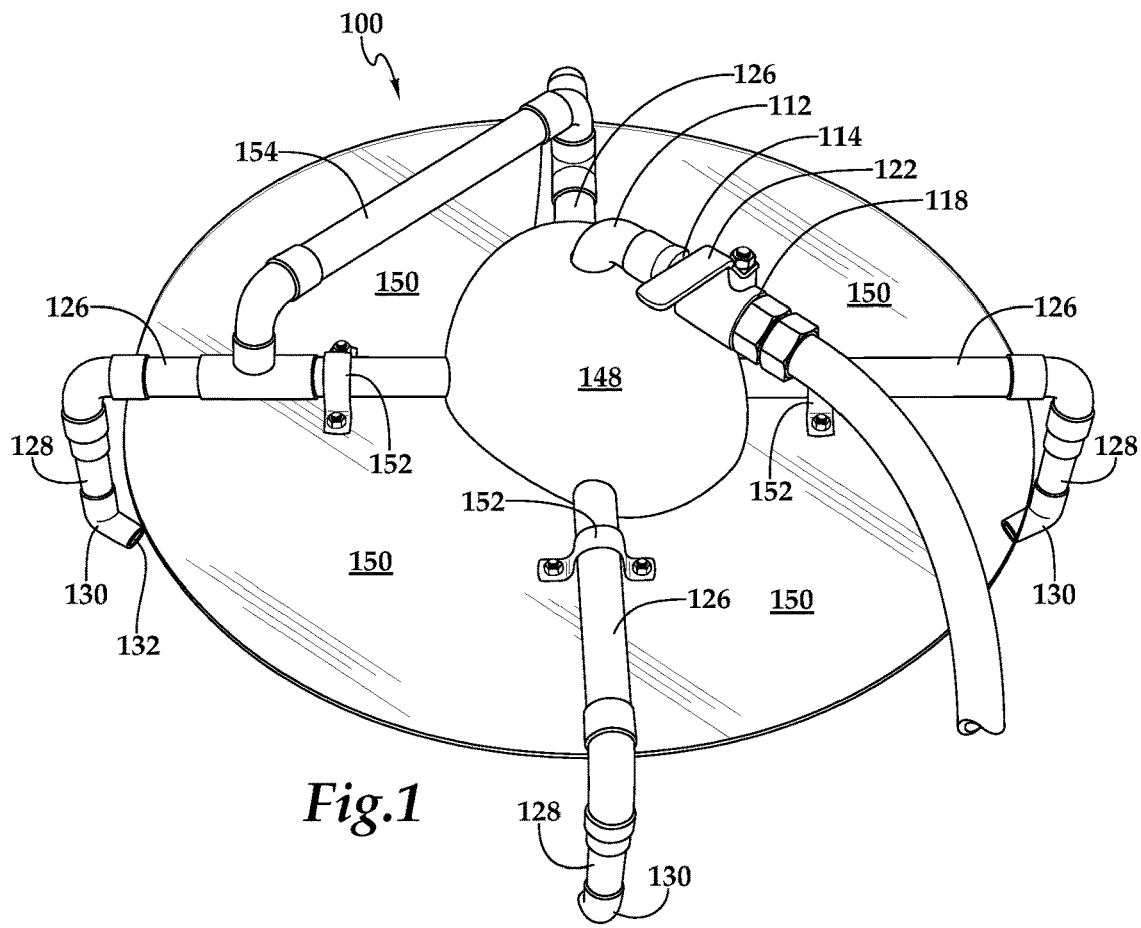
FIG. 1 illustrates an exemplary bead seating device.

The present invention relates generally to tire servicing operations and, more specifically, to an improved tire bead seating device. In particular, the bead seating device may be configured to create an airtight seal between the bead of a tire and a rim effectively and efficiently. The figures illustrate different views of an exemplary bead seating device.

FIGS. 1-6 illustrate an exemplary bead seater 100. As shown, bead seater 100 may be configured for tire servicing operations of a wheel assembly 102. In particular, as detailed below, bead seater 100 may be configured to facilitate directing pressurized gas into an interior cavity 104 of a tire 106 to help seat a bead 108 onto a rim 110. It is contemplated that bead seater 100 may include a unitary structure. Alternatively, various components of bead seater 100 may be joined by mechanical type fittings or via other methods, such as heat fusion.

As shown in FIG. 1-6, bead seater 100 may include an inlet 112 including an intake end 114 and a supply end 116. Intake end 114 may include a valve 118 configured to couple with a pressurized gas source 120. Gas source 120 may be configured to produce a high pressure compressed gas, such as air. Valve 118 may be configured to control a flow of said pressurized gas from source 120, such as via lever 122.

As shown in FIGS. 3-6, supply end 116 may be coupled to a splitter 124. Splitter 124 may be configured to split a stream of pressurized gas into a plurality of outlet streams. Outlet streams of pressurized gas may be distributed through two, three, four, or more outlets 126 connected to and radially extending from splitter 124. The outlets preferably are spaced apart at regular intervals and may be positioned generally opposite each other and aimed radially inwardly and downwardly, such that they can be aimed into a space formed between a tire and a rim. A length of outlets 126 may range between about ten inches and about fifteen inches. In one embodiment, outlets 126 may have a length of about twelve inches.

As shown, bead seater 100 may include four outlets 126 arranged, for example, in the form of spider legs such that an angle of about ninety degrees is created between each outlet along a longitudinal axis. Other quantities and arrangements of outlets 126 are contemplated.

Referring back to FIG. 1 and FIG. 2, each outlet 126 may include a leg 128. As shown, legs 128 may extend downwardly from each corresponding outlet 126. A length of legs 128 may range between about five inches and about ten inches. In one embodiment, legs 128 may have a length of about eight inches.

It is further contemplated that legs 128 may be extendable relative to each outlet 126 to, for example, accommodate for wheel assemblies of various dimensions. For instance, legs 128 may include a plurality of telescoping members having a decreasing diameter such that each leg 128 may be extendable between about two inches and about twenty inches, and preferably between about five inches and about ten inches. Telescoping members may be a flexible material that acts as a bearing and accommodates slight misalignment to prevent air leaks.

Figure 2:
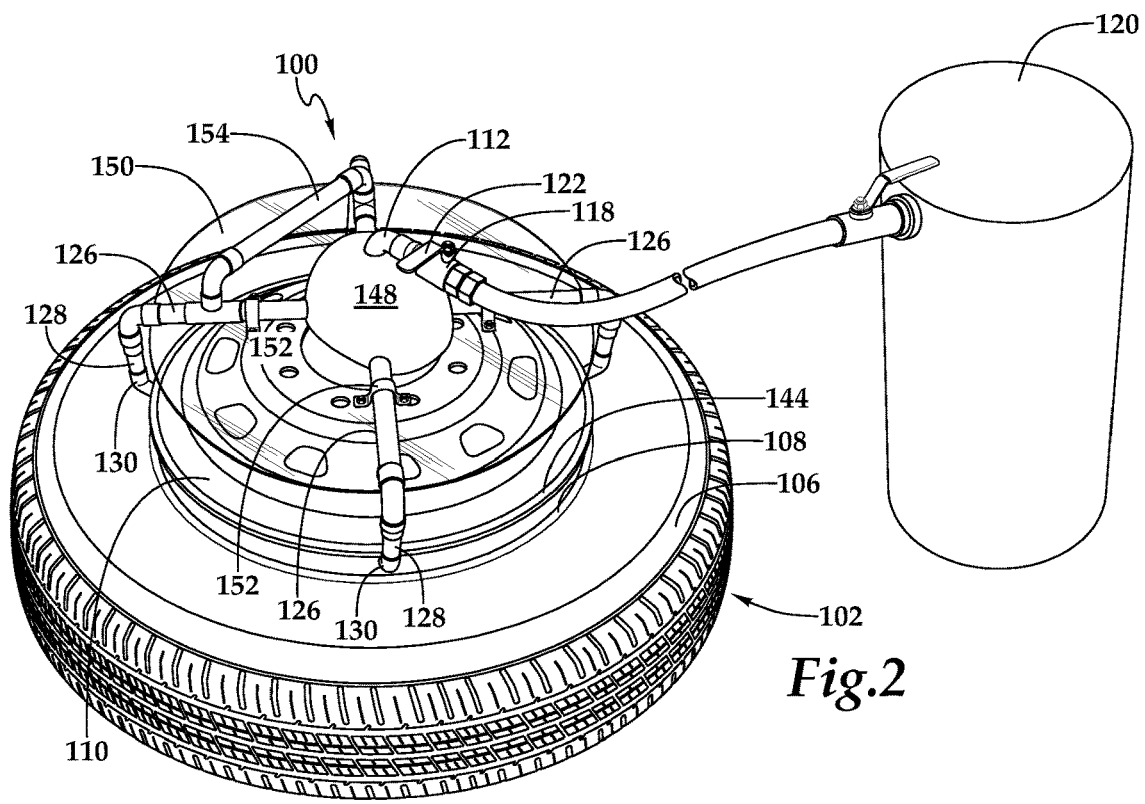
FIG. 2 is a perspective view of the bead seater of FIG. 1 arranged on a wheel assembly including a tire and a rim.
Figure 3:
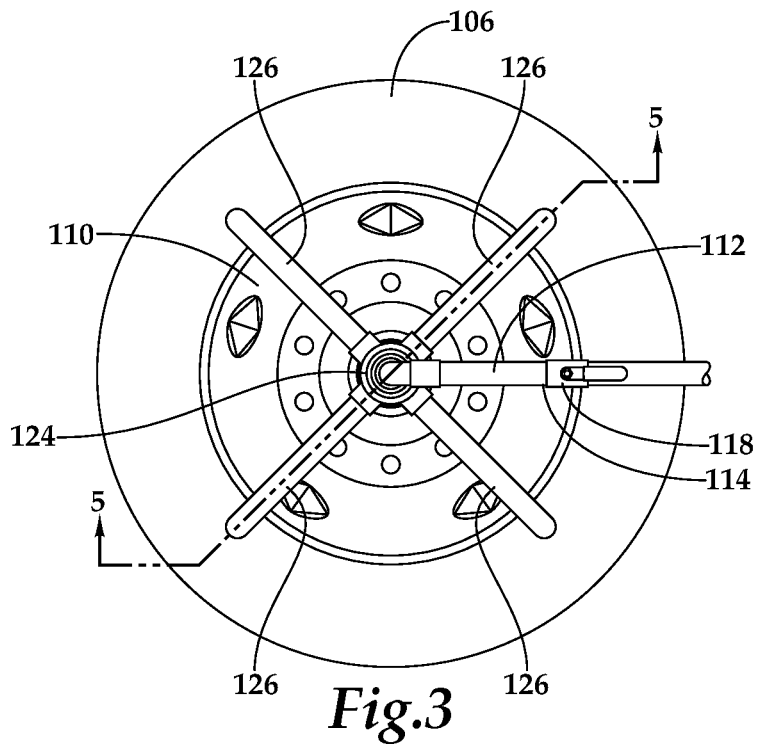
FIG. 3 is a top view of the bead seater of FIG. 1 arranged on a wheel assembly.

Further, as shown in FIGS. 1-2, each leg 128 of bead seater 100 may be rotatably coupled to a nozzle 130. Nozzles 130 may be constructed from sheet metal such as steel, aluminum or other metal or may be molded or fabricated from engineering plastics or cast from metal. Nozzles 130 may include an outlet port 132. As shown, ports 132 may be angled relative to legs 132.

Figure 4:
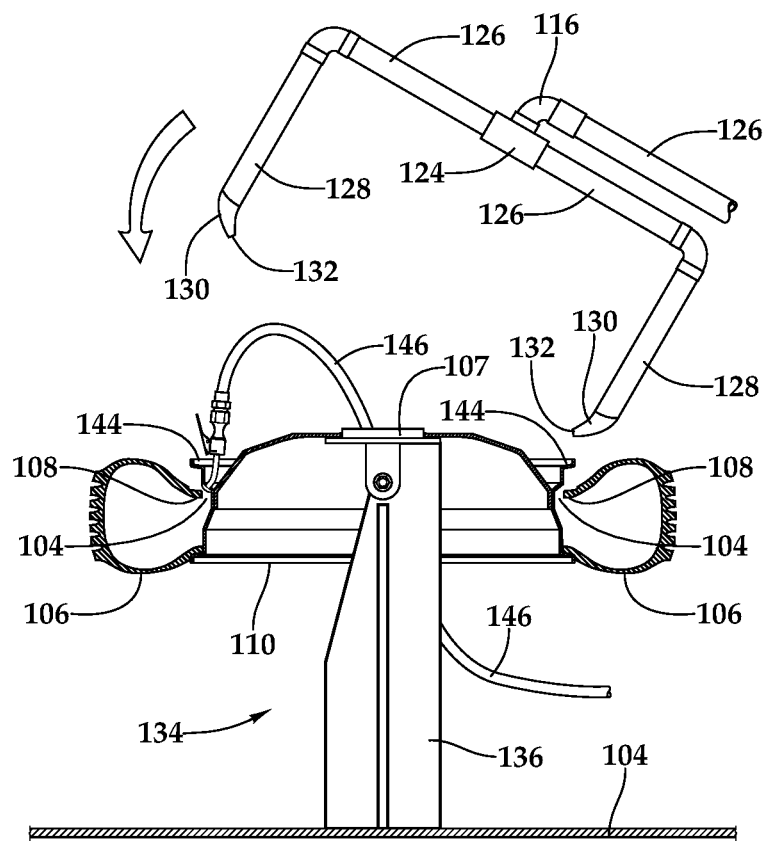
FIG. 4 is a sectional view of the bead seater of FIG. 1 including a wheel assembly having a tire unseated from a rim.
Figure 5:
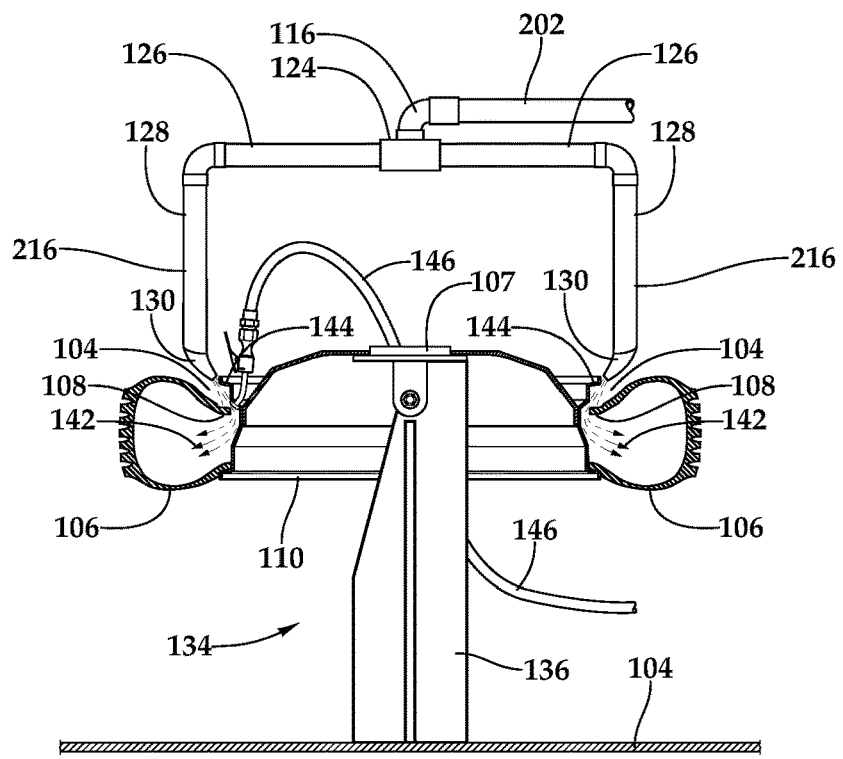
FIG. 5 illustrates the bead seating device of FIG. 1 arranged to direct a pressurized gas into a cavity of a tire.
Figure 6:
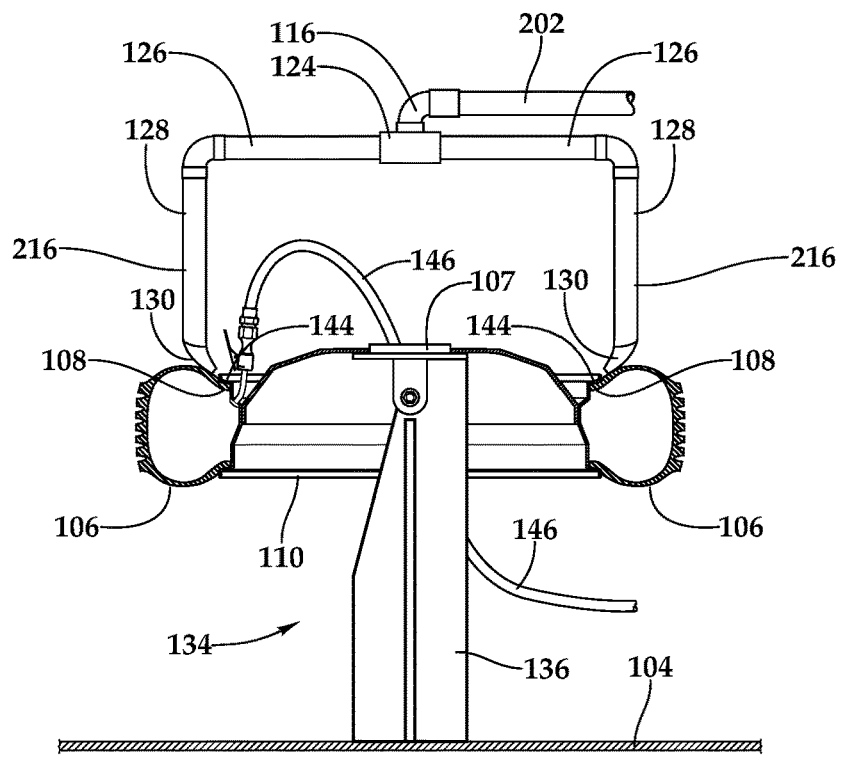
FIG. 6 illustrates seating a bead of a tire on a rim via the bead seating device of FIG. 1.

FIGS. 4-6 illustrate an exemplary method of using bead seater 100. As shown, bead seater 100 may be used with a post member 134 configured to receive tire 106. Post member 134 may include one or more supports 136 pivotably coupled to circular head 138. Circular head 138 may freely pivot between a tire receiving position and a tire servicing position. In the receiving position, circular head 138 may be substantially perpendicular or slightly angled relative to a ground level 140. As shown in FIGS. 4-6, in the servicing position, circular head 138 may be substantially parallel to ground level 140. It is further contemplated that circular head 138 may be locked or unlocked in a particular position or configuration. For example, an operator may lock circular head 138 in the servicing position by turning circular head 138 clockwise and unlock by turning circular head 138 counterclockwise.

Once wheel assembly 102 is in position, as shown in FIG. 4 and FIG. 5, an operator, for example, may position bead seater 100 such that nozzles 130 may direct a pressurized gas 142 into an interior cavity 104 of tire 106. Further, as shown in FIG. 6, pressurized gas 142 blown into cavity 104 may create a pressure differential, thereby pushing bead 108 against the lip 144 to seal tire 106 to the rim 110. Once wheel assembly 102 is properly seated, an operator may inflate or deflate tire 106, such as via an air hose 146.

Additional exemplary components of bead seater 100 are illustrated in FIG. 1 and FIG. 2. As shown, bead seater 100 may include a shell 148. Shell 148 may cover splitter 124 and a portion of inlet 112 and outlets 126. In particular, inlet 112 may extend upwardly from shell 148. Further, outlets 126 may extend outwardly from shell 148. Shell 148 is shown as semicircular in shape, however, other shapes are contemplated. Moreover, although not shown, it is contemplated that shell 148 may be removably coupled to a tire servicing structure, such as a cage. For example, a tire servicing cage may include one or more holes for receiving legs 126 into an interior of the cage.

Further, bead seater 100 may include one or more screens 150. As shown, screens 150 may be arranged between outlets 126. A strap 152 may be configured to secure adjacent screens 150 to one another. Screens 150 may be formed of an acrylic, epoxy or other clear plastic material to, for example, deflect pressurized gas and debris.

As further shown in FIGS. 1-2, bead seater 100 may include a handgrip 154. Handgrip 154 may extend from and be secured to two or more outlets 126. Handgrip 154 may be made of the same or a different material as other components of bead seater 100. Moreover, handgrip 154 may assist an operator in moving and selectively positioning nozzles 130 with minimum effort to accommodate wheel assemblies of different shapes and sizes. A length of handgrip 154 may range between about five inches and about twenty inches, and preferably between about ten inches and about fifteen inches. In one embodiment, handgrip 154 is approximately twelve inches in length.

Further modifications and alternative embodiments of various aspects of the invention will be apparent to those skilled in the art in view of this description. Accordingly, this description is to be construed as illustrative only and is for the purpose of teaching those skilled in the art the general manner of carrying out the invention. It is to be understood that the forms of the invention shown and described in the application are to be taken as examples of embodiments. Elements and materials may be substituted for those illustrated and described in the application, parts and processes may be reversed, and certain features of the invention may be utilized independently, all as would be apparent to one skilled in the art after having the benefit of this description of the invention. Changes may be made in the elements described in the application without departing from the spirit and scope of the invention as described in the following claims.

What is claimed is:

1. A bead seating device, comprising:
   an intake configured to receive a pressurized gas;
   one or more screens; and
   two or more outlets coupled to said intake, said outlets spaced apart and extending downwardly and radially inwardly for directing the pressurized gas to seat a tire bead.

2. The bead seating device of claim 1, further comprising a valve operatively coupled to said intake, said valve configured to control a flow of said pressurized gas.

3. The bead seating device of claim 2, wherein said handgrip is secured to at least two outlets.

4. The bead seating device of claim 1, further comprising a handgrip.

5. The bead seating device of claim 1, wherein said screens are arranged between said two or more outlet.

6. The bead seating device of claim 5, wherein said screens are coupled via a strap.

7. The bead seating device of claim 6, wherein said screens are formed of a plastic material.

8. The bead seating device of claim 1, wherein four outlets are coupled to said intake.

9. The bead seating device of claim 8, wherein an angle of about ninety degrees is created between each outlet along a longitudinal axis.

10. The bead seating device of claim 1, wherein a leg of each outlet leg is extendable with respect to each corresponding outlet.

11. The bead seating device of claim 1, wherein a leg of each outlet is extendable between about five inches and about ten inches.

12. The bead seating device of claim 1, further comprising a shell, wherein a portion of said outlets is encompassed by said shell.

13. The bead seating device of claim 12, wherein said shell is semicircular in shape.

14. The bead seating device of claim 12, wherein said shell is removably coupled to a tire servicing cage.

15. The bead seating device of claim 14, wherein said tire servicing cage includes one or more holes for receiving said legs, each leg extending into an interior of said cage.

16. The bead seating device of claim 1, wherein a nozzle of each outlet is angled and configured to direct the pressurized air between a rim and a tire.

17. The bead seating device of claim 1, wherein said outlets extend radially between about ten inches and about fifteen inches in length.

18. The bead seating device of claim 1, wherein said outlets extend downwardly between about five inches and about ten inches in length.

19. A bead seating device, comprising:
    an inlet including an intake end, said intake end configured to receive a pressurized gas;
    a splitter coupled to a supply end of said inlet;
    two or more outlets coupled to said splitter, said outlets extending outwardly from said splitter;
    a leg extending downwardly from each outlet; and
    a nozzle rotatably coupled to each leg, said nozzle configured to direct the pressurized gas for seating a tire bead.

20. A bead seating device, comprising:
    an intake configured to receive a pressurized gas; and
    two or more outlets coupled to said intake, said outlets spaced apart and extending downwardly and radially inwardly for directing the pressurized gas to seat a tire bead, wherein a leg of each outlet is extendable with respect to each corresponding outlet.

* * * * *